(12) United States Patent
Krautkramer et al.

(10) Patent No.: US 9,975,298 B2
(45) Date of Patent: May 22, 2018

(54) FILAMENT WINDING APPARATUS

(71) Applicant: Kimberly-Clark Worldwide, Inc., Neenah, WI (US)

(72) Inventors: Robert Eugene Krautkramer, Combined Locks, WI (US); Matthew Robert Wilson, Oshkosh, WI (US); Kyle Andrew Krautkramer, Kaukauna, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 79 days.

(21) Appl. No.: 15/308,527

(22) PCT Filed: Jun. 30, 2016

(86) PCT No.: PCT/US2016/040256
§ 371 (c)(1),
(2) Date: Nov. 2, 2016

(87) PCT Pub. No.: WO2017/023455
PCT Pub. Date: Feb. 9, 2017

(65) Prior Publication Data
US 2017/0182720 A1    Jun. 29, 2017

Related U.S. Application Data

(60) Provisional application No. 62/199,569, filed on Jul. 31, 2015.

(51) Int. Cl.
*B29C 53/66* (2006.01)
*B29C 70/32* (2006.01)
(Continued)

(52) U.S. Cl.
CPC ............ *B29C 70/54* (2013.01); *B29C 53/583* (2013.01); *B29C 53/66* (2013.01); *B29C 70/32* (2013.01);
(Continued)

(58) Field of Classification Search
CPC ....... B21F 17/00; B29C 53/58; B29C 53/583; B29C 53/60; B29C 53/62; B29C 53/66;
(Continued)

(56) References Cited

U.S. PATENT DOCUMENTS 2,011,463 A * 8/1935 Vianini ............... B28B 19/0038
                                                              138/176
2,690,412 A    9/1954 Nebesar
(Continued)

FOREIGN PATENT DOCUMENTS

GB           344356 A     3/1931
KR       10-1416593 B1    7/2014
WO    WO 2008/039076 A1   4/2008

*Primary Examiner* — Michael A Tolin
(74) *Attorney, Agent, or Firm* — Kimberly-Clark Worldwide, Inc.

(57) ABSTRACT

The present invention generally relates to an improved winding apparatus useful in the production of filament wound products and particularly wound tubular products having high length to diameter ratios. The improved winding apparatus comprises a support means for supporting a rotatable mandrel during the manufacture of wound products, the support means comprising a plurality of axially spaced pins extending circumferentially around the mandrel, and a support assembly having a semicircular inner face and an opening, wherein a portion of the plurality of pins is brought into contact with the inner face of the support assembly when the mandrel is rotated.

7 Claims, 3 Drawing Sheets

(51) Int. Cl.
*B29C 70/54* (2006.01)
*B65H 54/02* (2006.01)
*B65H 54/28* (2006.01)
*B29C 53/58* (2006.01)
*B29K 307/04* (2006.01)

(52) U.S. Cl.
CPC ............ *B65H 54/02* (2013.01); *B65H 54/28* (2013.01); *B29K 2307/04* (2013.01)

(58) Field of Classification Search
CPC . B29C 53/8008; B29C 53/821; B29C 53/824; B29C 70/32; B29C 70/54; B29D 23/001; B29L 2023/005; B29L 2023/22; B65H 81/08
See application file for complete search history.

(56) References Cited

U.S. PATENT DOCUMENTS

| | | | |
|---|---|---|---|
| 3,140,900 A | 7/1964 | Martin | |
| 3,187,494 A * | 6/1965 | Fuller | B21F 17/00 156/175 |
| 3,202,560 A | 8/1965 | Michael | |
| 3,519,520 A * | 7/1970 | Newman, Jr. | B29C 33/044 156/173 |
| 4,856,720 A * | 8/1989 | Deregibus | B29C 53/8008 156/429 |
| 4,863,416 A | 9/1989 | Gupta | |
| 4,917,756 A | 4/1990 | Cahuzac et al. | |
| 5,061,533 A | 10/1991 | Gomi et al. | |
| 5,213,275 A | 5/1993 | Giesy | |
| 5,468,329 A * | 11/1995 | Philpot | B29C 53/8016 156/169 |
| 5,676,330 A * | 10/1997 | Zhu | B65H 81/08 220/588 |
| 5,685,933 A | 11/1997 | Ohta et al. | |
| 8,277,716 B2 | 10/2012 | Galle et al. | |
| 2006/0082140 A1 | 4/2006 | Rytter | |
| 2009/0309356 A1 | 12/2009 | Saltel | |

* cited by examiner

continued …

FILAMENT WINDING APPARATUS

BACKGROUND OF THE DISCLOSURE

When forming elongated, hollow articles of fiber-reinforced composite material, such as hollow beams or the like, a metallic core or bar is often used as a mandrel or tool, around which a plurality of layers of a resin-impregnated filament is applied by winding it in an overlapping manner to form a laminated, semi-finished article. After curing of this composite article in a subsequent heat-treatment step, e.g. in an oven or autoclave, the cured article is cooled together with the tool bar. In the cooling phase, normally in room temperature, the tool bar shrinks to a certain degree, i.e. the cross-sectional area and the length of the tool bar is somewhat reduced, whereas the dimensions of the cured article remain substantially unchanged. In some cases, especially where the article and the tool bar are slightly curved in one or two directions and have a lengthwise tapered configuration, the shrinkage of the tool bar may cause undesired engagement between the tool bar and the cured article at certain locations along the tool bar due to uncontrolled mutual longitudinal movements of the tool bar and the article during the cooling phase. This may irrevocably damage the article at certain locations when dismantling the same from the tool bar.

SUMMARY OF THE DISCLOSURE

It is a primary object of the present invention to provide an improved apparatus and methods for forming an elongated, hollow article of a fiber-reinforced composite material which eliminates the above-mentioned drawback of the prior art methods. Owing to the deflection of the mandrel, particularly during the manufacture of hollow tubes having high length to diameter ratios such as ratios greater than about 50:1 and in certain embodiments greater than about 60:1, there is a need to better support the mandrel during the winding process. Support of the mandrel along at least one point between its first and second ends minimizes or prevents mandrel deflection, improves the manufacturing process and improves the quality of the finished product.

Thus, in one aspect the present invention provides a winding apparatus comprising a mandrel having first and second ends and rotatable about a central axis, the mandrel having an outer surface from which a plurality of axially spaced pins extend circumferentially around the mandrel and a support assembly having a semicircular inner face and an opening, wherein a portion of the pins contact the inner face of the support assembly.

In other aspects the present invention provides a mandrel comprising a body portion having a first and a second end, a pair of pin rings disposed proximal to the first and second ends and a row of support pins disposed between the pair of pin rings, the row of support pins extending outward from the top mandrel surface and axially spaced about the circumference of the mandrel.

In still other aspects the present invention provides a support means for supporting a mandrel during the manufacture of wound products, the support means comprising a plurality of axially spaced pins extending circumferentially around the mandrel and a support assembly having a semicircular inner face and an opening, wherein a portion of the plurality of pins is brought into contact with the inner face when the mandrel is rotated.

In yet other aspects the present invention provides a mandrel assembly having an axis of rotation, for manufacturing filament wound parts, the mandrel assembly comprising a body having a top surface, a first end and a second end, a first pin ring disposed proximal to the first end and a second pin ring disposed proximal to the second end, and a row of support pins disposed between the first and second pin rings, the support pins being axially spaced from one another and extending circumferentially around the mandrel.

In still other aspects the present invention provides a method of making a filament wound part comprising the steps of winding a filament on a mandrel having a plurality of axial extending support pins circumferentially spaced about the mandrel, at least a portion of the plurality of support pins contacting a support assembly thereby rotatably supporting the mandrel, repeatedly winding the filament, removing the support pins, and removing the windings from the mandrel.

These and other embodiments will be described in more detail with reference to the drawings.

DETAILED DESCRIPTION OF THE DISCLOSURE

The present invention is useful in the production of composite tubes and more particularly a composite tube having a high length to diameter ratio, such as greater than about 50:1, and in certain embodiments greater than about 60:1. At such high ratios of length to diameter, conventional winding apparatuses are not able to reliably produce products that are straight and have the desired flex and torque characteristics. The present invention overcomes the limitations of conventional winding apparatuses by introducing a support means that significantly reduces the amount of deflection during the winding process without interfering with the conventional winding process or requiring significant modification of conventional winding apparatuses.

The present invention is described herein with reference to conventional filament winding equipment, but it should be understood that the principles of this invention may be useful in alternative fabrication methods such as braiding and wrapping. Further, the present invention may be useful in any number of different methods of forming a composite tube such as, winding fibers impregnated with resin over a mandrel, laying fibers impregnated with resin over a mandrel or winding fibers over a mandrel and subsequently impregnating the fibers with resin.

Figure 1:
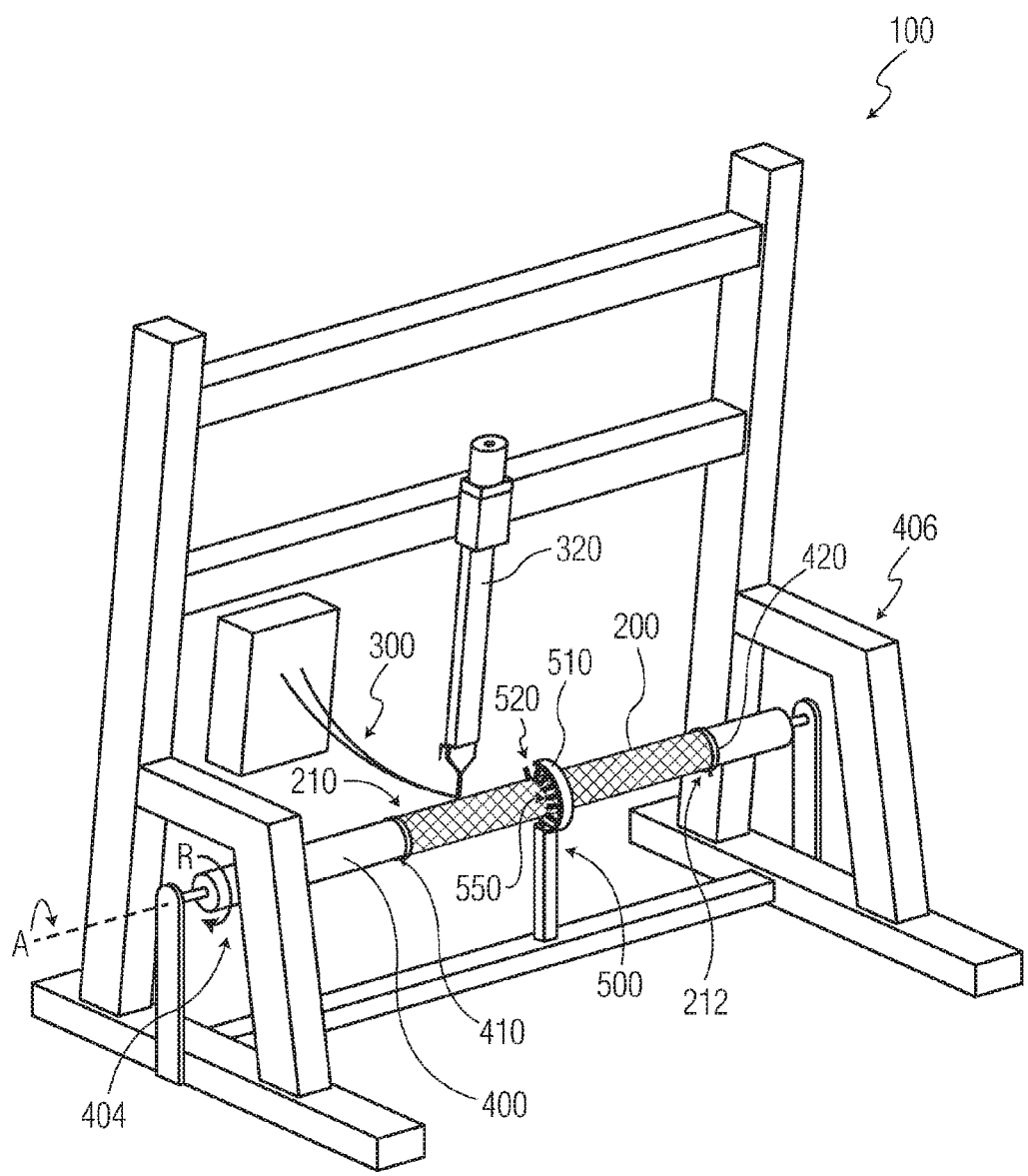
FIG. 1 illustrates a filament winding apparatus according to one embodiment of the present invention.

With reference now to the figures, FIG. 1 depicts a filament winding machine 100 for winding a part 200. A continuous filament 300, such as a continuous filament of carbon fiber, is wound in a desired pattern on a mandrel 400 to produce the part 200. Winding of the continuous filament 300 occurs by rotating the mandrel 400 about its longitudinal axis (A) at a selected rate while the continuous filament 300 is delivered by a filament delivery means 320. The continuous filament 300 is wound about the mandrel 400 until it reaches a first pin ring 410 located adjacent to a first end 404 of the mandrel 400. The pin ring 410 acts to redirect the continuous filament 300 causing it to reverse direction and continue winding along the mandrel 400 towards the second end 406. The filament 300 continues to be wound about the mandrel 400 until it reaches the second pin ring 420 located at the second end 406. The filament delivery means 320 then reverses direction and the process is repeated any number of times to form the part 200.

In one embodiment resin impregnated fibers are wound around the mandrel using at least a two-axis filament winding machine, delivered by a feed-eye that traverses alongside the rotating mandrel in the mandrel's axial direction. The fibers are laid about the mandrel between the pin rings with a near-axial fiber orientation with respect to the mandrel's axial direction, or at an angle that optimally suits the loads to be applied to the composite tube.

Mandrels 400 fitted with pin rings 410, 420 are well known in the art and any number of different geometries and configurations may be useful in the present invention. Suitable pin rings may include, for example, those disclosed in U.S. Pat. No. 5,468,329, the contents of which are incorporated herein in a manner consistent with the present invention. Similarly, useful mandrels are well known in the art and a number of different geometries may be employed in the present invention. For example, the mandrel may have a circular cross-section, or in other embodiments may have a non-circular cross-section such as an elliptical cross-section.

In certain embodiments, resin (not shown) is placed on the filament 300 during the winding process. The pin rings 410, 420 firmly secure the filament 300 at first and second product ends 210, 212 and prevent slippage of the filament 300. Slippage of the filament 300 can cause defects in or rejection of the manufactured part 200. The regions in which the continuous filament 300 reverses direction during the winding process are kept to a minimum size to minimize material waste. This may be achieved by using a pin ring that properly guides the filament so that it quickly conforms to the contour of the mandrel and is anchored in place without slippage. When winding is complete, the wound part 200 is cured and the turnaround regions are cut off and discarded.

The mandrel 400 has an axle for rotation about a longitudinal axis A, the longitudinal dimension being parallel to the axis of rotation for purposes of this description. In a particularly preferred embodiment the mandrel 400 has a generally cylindrical shape, although another shape could be used. The mandrel 400 has a plurality of outwardly extending, generally radially extending, support pins 550 although other structures may be used to contact the support assembly 500 and support the rotating mandrel 400 as described below. The support pins 550 are circumferentially arrayed in a ring. The support pins 550 are generally equally spaced circumferentially although other configurations are possible. In particularly preferred embodiments the support pins 550 are retractable into the mandrel 500 or readily removable from the mandrel upon completion of product winding for removal of the completed product. The pins can be retracted with hydraulics or mechanical linkages, for example, and may include a cam action inside the mandrel.

Figure 2:
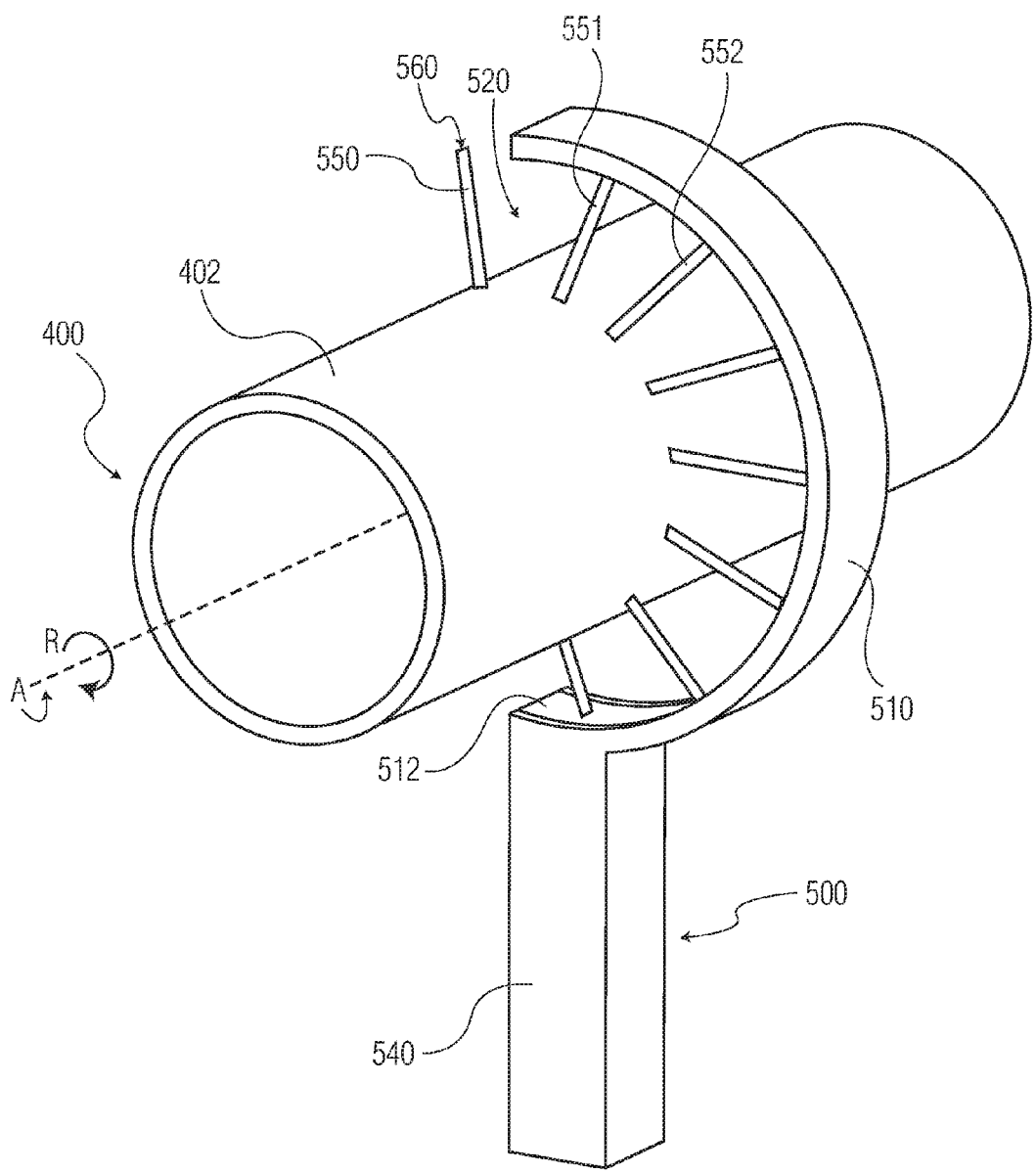
FIG. 2 illustrates a rotatably supported mandrel according to another embodiment of the present invention.

To support the mandrel during the winding process a support assembly 500 is disposed between the first and second pin rings 410, 420. As illustrated in more detail in FIG. 2 the support assembly 500 comprises a semicircular ring 510 with an opening 520. The semicircular ring 510 may be attached to the mandrel support frame by a support assembly base 540. The mandrel 400 comprises a plurality of axially spaced support pins 550, 551, 552 extending from the mandrel surface 402. Generally the axial spacing of the plurality of pins is with reference to the bottom end of the pins, which are distal from the first end 560 where the pins attach to the mandrel, to the longitudinal axis (A). The plurality of pins 550, 551, 552 extend outwardly from the mandrel surface 402 and terminate at a support pin end. The pin end 560 of the first support pin 550 is illustrated in FIG. 2. The plurality of support pins 550, 551, 552 rotate when the mandrel 400 is rotated (R) about the axis (A), bringing the support pins 550, 551, 552 into contact with the support assembly 500. As a support pin passes the support assembly 500 opening 520 it contacts the support assembly 500 thereby supporting the mandrel 400 during the winding process and preventing deflation of the mandrel.

One skilled in the art will appreciate that the support pins are spaced continuously about the circumference of the mandrel and that the number of support pins employed may vary depending on the dimensions of the finished work product and winding conditions. In certain embodiments the support apparatus may comprise from about 5 to about 40 support pins, such as from about 10 to about 30 support pins and more preferably from about 20 to about 25 support pins. The axial direction spacing of the support pins may also be varied depending on the dimensions of the finished product, the mandrel and the winding conditions. For example, the axial direction spacing may range from about 0.1 to about 2 inches, more specifically from about 0.2 to about 1.0 inch, and still more specifically from about 0.25 to about 0.75 inch. The spacing of the support pins and the corresponding degree of interaction with the support assembly will influence the stability of the winding operation and the structural integrity of the resulting product.

Turning now to the support assembly 500, which contacts and supports a portion of the support pins 550, 551, 552 as they rotate with the mandrel 400. The support assembly 500 generally comprises a semicircular ring 510 having an inner face 512. The semicircular ring 510 has an opening 520 generally facing the filament delivery means 320 such that the filament 300 may pass from the opening 520 and to the part being wound on the mandrel 400 without interference. In this arrangement there is a period of time during which a portion of the support pins 550, 551, 552 are not supported by the support assembly 500 as they rotate through the opening 520. However, as the support pins 550, 551, 552 pass the opening 520 they are brought into contact with the semicircular inner face 512 to support the mandrel 400. One skilled in the art will appreciate that the size of the opening, the radius of the semicircular inner face and the extent of interaction between the support pins and the semicircular inner face may vary depending on the winding conditions and the product.

The support assembly may be a single unitary piece or may be formed from two or more pieces. In certain embodiments the support assembly is formed from two or more pieces that may be separated from one another to facilitate loading the mandrel into the support apparatus. In such embodiments a fastener may be used to join the two or more pieces or, in other embodiments, the pieces may be joined together by a hinge or the like.

The radius of the semicircular section of the support assembly is approximately equal to the radius defined by the outer most ends of the support pins radiating from the mandrel. In this manner, when the mandrel is inserted into the support apparatus the support pins and the inner surface of the support assembly are brought into contact with one another. Further, it is preferred that the support pins engage the support assembly throughout the entirety of the inner surface of the support assembly, that is, the radii of the semicircle section substantially corresponds to the outer diameter of the support pins.

While the radii of the semicircle section substantially corresponds to the outer diameter support pins, the extent to which the semicircular section surrounds the support pins may vary from about 50 to about 90 percent, more preferably from about 60 to about 80 percent and still more preferably from about 70 to about 75 percent. Regardless of the extent to which the semicircular section surrounds the support pins there remains an opening which allows the filament to pass through the support assembly to the mandrel such that winding and mandrel support may occur simultaneously.

Figure 3:
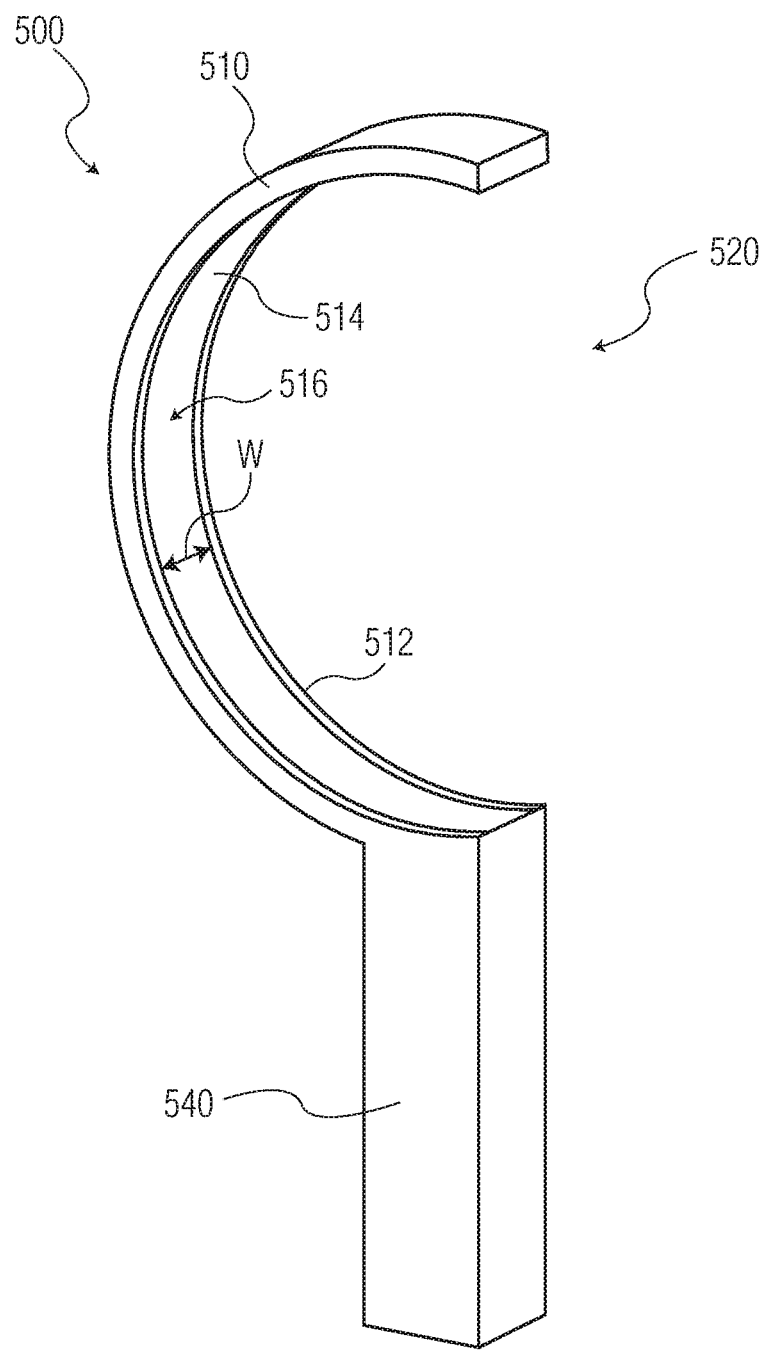
FIG. 3 illustrates a support assembly useful in the present invention.

Turning now to FIG. 3, in certain preferred embodiments the semicircular inner face 512 comprises a channel 514 having a bottom surface 516 for receiving the plurality of support pins. The channel 514 may extend substantially continuously along the length of the semicircular inner face 512 and have a width (w) sufficient to receive the pins. In this way as the pins rotate they are brought into contact with the bottom surface 516 and are seated in the channel 514 such that they are brought into secure engagement with the support assembly 500 and support the mandrel during the winding process.

In general the support pins may be of any general shape or dimension and may vary depending on the winding application and degree of mandrel support needed. In certain preferred embodiments the distal ends of the pins may be coated with a second material to facilitate passage along the inner surface of the support assembly. In still other embodiments the distal ends of the pin may comprise rollers or the like.

The support pins may be formed integrally with the mandrel or may comprise a separate piece. In those embodiments where the support pins comprise a separate piece the support rings may comprise an elongated backing strip from which a row of pins protrude. The individual pins protrude from reinforcing ribs on the proximal side of the support ring (as compared to the distal side of the support ring which is the side that contacts the mandrel). The reinforcing ribs provide a strengthened area on the backing strip so that the pins can withstand lateral forces without collapsing. The pins are generally provided as a single row of pins so as not to disrupt or alter the path of the filament as it is wound onto the mandrel. In this manner the support pins generally guide the filament so that it quickly conforms to the mandrel contour as it passes by the support pins.

In alternative embodiments all of the dimensions of the invented support ring can be altered. In particular, length, diameter and spacing of both individual pins may be modified for particular applications. For example, if a large component is to be manufactured, then longer, thicker and more widely spaced pins may be desirable to accommodate a greater depth of fiber. In contrast, if small diameter thin-walled components are to be manufactured, then thin closely spaced pins may be preferred. Also, individual pins may be of many configurations, including round, square, triangular, oval, octagonal, tear-drop shaped and otherwise in longitudinal cross section.

In use the ring of support pins is sized appropriate for the desired mandrel diameter. Depending on the diameter of the mandrel to be used, this can be accomplished by trimming the support ring to a length approximately equal to the circumference of the mandrel. Next, the sized support ring is secured to the mandrel. Once the support ring is secured the mandrel is placed in the winding apparatus and the support assembly is positioned so as to contact a portion of the support pins. After the mandrel is secured and the support pins are engaged with the support assembly the filament is wound between the two pin rings, the filament being anchored by and turning around each pin ring and the fiber delivery means passes it. Resin is contacted with the filament during this process, and a wound part results. When the winding is complete the wound part is removed from the winding machine and cured on the mandrel by known prior art curing techniques. Following curing, the support pins can be retracted into the mandrel or otherwise removed so as to facilitate removal of the product from the mandrel. Further, after the product is removed from the mandrel, the turnaround area may be cut from both ends of the wound part.

While the present invention has been described and illustrated in conjunction with a number of specific embodiments, those skilled in the art will appreciate that variations and modifications may be made without departing from the principles of the invention as herein illustrated, described and claimed. The present invention may be embodied in one or more of the following embodiments:

In a first embodiment the present invention provides a mandrel assembly having an axis of rotation, for manufacturing filament wound parts, the mandrel assembly comprising a body having a top surface, a first end and a second end, a first pin ring disposed proximal to the first end and a second pin ring disposed proximal to the second end, and a row of support pins disposed between the first and second pin rings.

In a second embodiment the present invention provides the invention of the first embodiment wherein the support pins are retractable into the mandrel.

In a third embodiment the present invention provides the invention of any one of the first or second embodiments wherein the support pins are removable from the mandrel.

In a fourth embodiment the present invention provides the invention of any one of the first through the third embodiments wherein the support pins extend radially from the mandrel.

In a fifth embodiment the present invention provides the invention of any one of the first through the fourth embodiments wherein the mandrel is generally cylindrical.

In a sixth embodiment the present invention provides the invention of any one of the first through the fifth embodiments wherein the support pins extend radially from the top surface of the mandrel and are axially spaced from one another about the circumference of the mandrel.

In a seventh embodiment the present invention provides the invention of any one of the first through the sixth embodiments wherein the plurality of support pins are equally circumferentially spaced.

In an eighth embodiment the present invention provides a mandrel support apparatus comprising a cylindrical mandrel having an outer surface, a plurality of support pins extending radially from the top surface of the mandrel and a support assembly having a semicircular inner surface and an opening, wherein at least two support pins contact the support assembly inner surface to rotatably support the mandrel.

In a ninth embodiment the present invention provides the invention of the eighth embodiment wherein the support pins are retractable into the mandrel.

In a tenth embodiment the present invention provides the invention of any one of the eighth or ninth embodiments wherein the support pins are removable from the mandrel.

In an eleventh embodiment the present invention provides the invention of any one of the eighth through the tenth embodiments wherein the support pins extend radially from the mandrel.

In a twelfth embodiment the present invention provides the invention of any one of the eighth through the eleventh embodiments wherein the mandrel is generally cylindrical.

In a thirteenth embodiment the present invention provides the invention of any one of the eighth through the twelfth embodiments wherein the support pins extend radially from the top surface of the mandrel and are axially spaced from one another about the circumference of the mandrel.

In a fourteenth embodiment the present invention provides the invention of any one of the eighth through the thirteenth embodiments wherein the plurality of support pins are equally circumferentially spaced.

What is claimed is:

1. An apparatus having a supported mandrel, the apparatus comprising:
   a cylindrical mandrel having an outer surface, a plurality of support pins extending radially from the outer surface of the mandrel, and
   a support assembly having a semicircular inner surface and an opening,
   wherein at least two support pins contact the support assembly inner surface to rotatably support the mandrel.

2. The apparatus having a supported mandrel of claim 1, wherein the support pins are circumferentially spaced from one another about the circumference of the mandrel.

3. The apparatus having a supported mandrel of claim 2, wherein the plurality of support pins are equally circumferentially spaced.

4. The apparatus having a supported mandrel of claim 1, wherein the support pins are retractable into the mandrel.

5. The apparatus having a supported mandrel of claim 1, wherein the support pins are removable from the mandrel.

6. The apparatus having a supported mandrel of claim 1, wherein the support assembly further comprises a channel extending substantially along the entire support assembly inner surface, the channel shaped to receive the plurality of support pins.

7. A method of making a filament wound part comprising the steps of:
   winding a filament on a mandrel having a plurality of axially extending support pins circumferentially spaced about the mandrel, at least a portion of the plurality of support pins contacting a support assembly thereby rotatably supporting the mandrel,
   repeatedly winding the filament,
   retracting the support pins into the mandrel or removing the support pins from the mandrel, and
   removing the windings from the mandrel.

* * * * *